UNITED STATES PATENT OFFICE.

ADOLF BAEYER AND VIGGO B. DREWSEN, OF MUNICH, BAVARIA, ASSIGNORS TO BADISCHE ANILIN AND SODA FABRIK, OF MANNHEIM, GERMANY.

ARTIFICIAL INDIGO.

SPECIFICATION forming part of Letters Patent No. 257,815, dated May 9, 1882.

Application filed March 11, 1882. (Specimens.)

*To all whom it may concern:*

Be it known that we, ADOLF BAEYER, a subject of the King of Bavaria, and VIGGO BEUTNER DREWSEN, a subject of the King of Sweden and Norway, both residing at Munich, in the Kingdom of Bavaria, Empire of Germany, have invented new and useful Improvements in the Manufacture of Artificial Indigo, of which the following is a specification.

This invention relates to the production of an artificial indigo from orthonitrobenzaldehyde.

In carrying out this invention we proceed as follows: We take about ten parts, by weight, of orthonitrobenzaldehyde and dissolve the same in about fifteen parts, by weight, of acetone. We then gradually mix the solution thus obtained with about one hundred and thirty parts, by weight, of a diluted caustic-soda liquor containing, say, about three parts, by weight, of caustic soda. We then allow the mixture to stand at an ordinary temperature for about twelve hours, or until the separation of a blue precipitate is complete. The said precipitate is then collected on a filter and well washed with water in order to eliminate therefrom free alkali or other soluble compounds. The insoluble blue residue constitutes the artificial indigo. It is used in the dye-bath in the same manner as the artificial indigo described in Patent No. 227,470, and it can be distinguished from vegetable and from the artificial indigo described in the said Patent No. 227,470 by its pure blue color, and by the absence in it of any coloring-matter soluble in alcohol with a red or purple color.

Although caustic soda only was named in the above process, similar results can be obtained by the use of other suitable alkalies; but we prefer to employ a diluted solution of caustic soda, as above described. In a similar manner orthonitrobenzaldehyde can be converted into an artificial indigo by substituting aldehyde or pyroracemic (pyruvic) acid or analogous bodies for the acetone named in the aforesaid process; but we do not claim in this application for a patent the use of aldehyde or pyroracemic (pyruvic) acid or analogous bodies, such process forming the subject-matter of a separate application for Letters Patent.

What we claim as new, and desire to secure by Letters Patent, is—

As a new product, an artificial indigo having the properties above stated, and prepared by the action of acetone upon orthonitrobenzaldehyde in the presence of a diluted solution of caustic soda, substantially as described, or by any other means which will produce a like result.

In testimony whereof we have hereunto set our hands and seals in the presence of two subscribing witnesses.

ADOLF BAEYER. [L. S.]
VIGGO BEUTNER DREWSEN. [L. S.]

Witnesses:
ADOLF SPIEGEL,
LUDWIG LEHMANN.